(12) United States Patent
Liang

(10) Patent No.: US 8,000,828 B2
(45) Date of Patent: Aug. 16, 2011

(54) SYSTEM AND METHOD FOR MOVEMENT CONTROL

(75) Inventor: Chien-Hao Liang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 418 days.

(21) Appl. No.: 12/268,418

(22) Filed: Nov. 10, 2008

(65) Prior Publication Data

US 2009/0254210 A1    Oct. 8, 2009

(30) Foreign Application Priority Data

Apr. 8, 2008  (CN) .................. 2008 1 0300873.9

(51) Int. Cl.
*G06F 19/00* (2011.01)
(52) U.S. Cl. .................... 700/117; 409/132
(58) Field of Classification Search .................. 700/117, 700/193; 409/132, 80; 318/568.13; 219/121.82
See application file for complete search history.

(56) References Cited

U.S. PATENT DOCUMENTS

| 4,150,320 | A | * | 4/1979 | Mitchell et al. ................ 313/478 |
| 4,267,497 | A | * | 5/1981 | Cannon et al. ................. 318/661 |
| 5,337,249 | A | * | 8/1994 | Fujita et al. .................... 700/180 |
| 5,444,640 | A | * | 8/1995 | Hirai ............................. 700/193 |
| 6,019,554 | A | * | 2/2000 | Hong ............................ 409/132 |
| 6,430,476 | B1 | * | 8/2002 | Schwaar et al. ............. 700/251 |
| 7,283,888 | B2 | * | 10/2007 | Evans et al. ................... 700/186 |
| 7,482,776 | B2 | * | 1/2009 | Scholich-Tessmann ...... 318/575 |
| 2006/0176002 | A1 | * | 8/2006 | Scholich-Tessmann ...... 318/575 |

OTHER PUBLICATIONS

R.W. Brocket, On the Copmuter Control of Movment,1998,Harvard University, p. 534-540.*
Liu et al. Dynamic Gain Motion Control with multi-Axis Trajectory Monitoring for Machine Tool System, 1998, IMS-Mechatronics Laboratory, p. 316-321.*

* cited by examiner

*Primary Examiner* — Kidest Bahta
(74) *Attorney, Agent, or Firm* — Frank R. Niranjan

(57) ABSTRACT

A system for controlling object movement on a machine. The system controls a speed of a working point of the machine according to a dynamic decay speed determined through an exponential function after the working point passes by a buffer distance. A related method and storage medium with instructions for performance of the method also provided.

12 Claims, 4 Drawing Sheets

SYSTEM AND METHOD FOR MOVEMENT CONTROL

BACKGROUND

1. Field of the Invention

The disclosure relates to machined objects, and particularly to a system and method for controlling movement of an object on a machine.

2. Description of Related Art

Linear movement of an object is often required in both testing and manufacturing process. Usually, a working point of an object is moved from an initial position to a target position along a linear track as depicted in FIG. 3. The object may be moved by a roller-type guideway, ball screws, or other means. Position of the working point may be determined by an optical sensor, and speed of the linear movement determined by comparing distance travelled with travel time. The speed of the linear movement may further be determined dynamically by a processor and controlled by a driver servo.

FIG. 3 is a schematic diagram of a method for controlling movement of an object on a machine. The object X is movable along a track on the machine. As shown, point A is an initial position of the object X on the track, and point D is a target position for the object X. A point C is a current position of the object X when the object X is moving on the machine. A point B is an exemplary point at which the object X starts decreasing speed. A point W is a working point on the object moving on the machine, usually the point of the object X closest to the point D. A speed V is a current speed of the object X, varying during movement of object X on the machine. A buffer distance parameter P is used for establishing point B, and also determining where the object X will start decreasing speed V. Additionally, L is a distance between the point C and the point D.

The object may, however, experience displacement during movement from the initial position to the target position, when speed is not decreased sufficiently or in a timely manner, resulting in the object passing the target position due to inertia. In some cases, displacement may not be a problem since the object may be returned to the target position. However, in other cases, particularly in precision machinery, displacement results in a severe problem, impacting accuracy and timing-based efficiency of production. Moreover, if the working point is within a proximity or a limited range of the target position, the displacement may cause object collision, machine damage, and affect process due to over-damping by the machine.

What is needed, therefore, is a system and method for controlling object movement on a machine.

DETAILED DESCRIPTION OF CERTAIN INVENTIVE EMBODIMENTS

Figure 1:
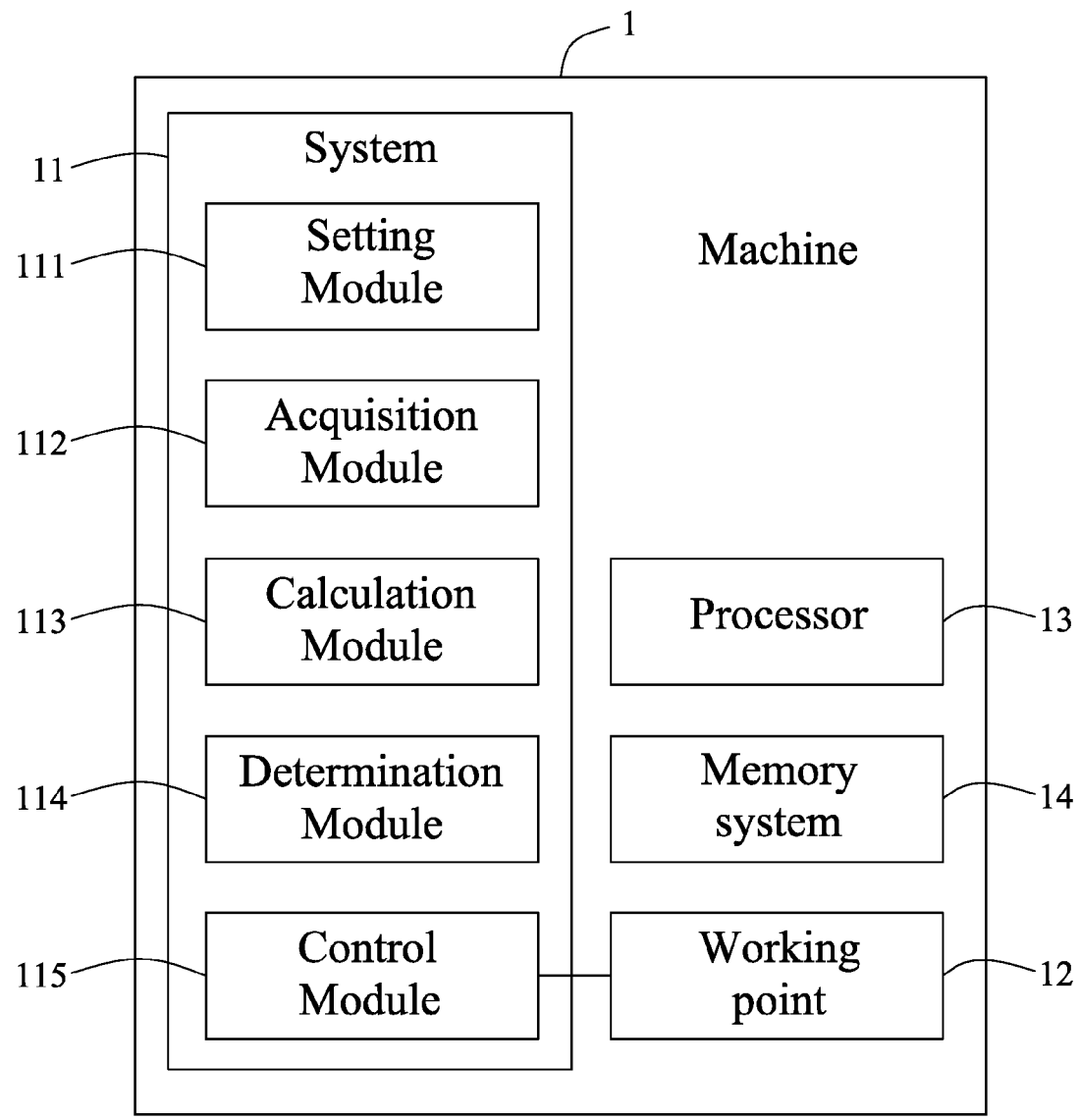
FIG. 1 is a block diagram of an embodiment of a system for controlling movement of an object on a machine.

All of the processes described may be embodied in, and fully automated via, software code modules executed by one or more general purpose computers or processors as depicted in FIG. 1. The code modules may be stored in any type of computer-readable medium or other storage device. Some or all of the methods may alternatively be embodied in specialized computer hardware or apparatus.

FIG. 1 is a block diagram of an embodiment of a system 11 for controlling movement of an object on a machine 1. The machine 1 includes the system 11, a working point 12, a processor 13, and a memory system 14. The system 11 is operable in the machine 1. The machine 1 may be a measurement machine, a testing machine, a fabrication machine, a control machine or any other type of machine. In an exemplary embodiment, the system 11 is connected to the working point 12 The working point 12 is the object movable on a track of the machine 1. Depending on the embodiment, the working point 12 may be movable on a linear track or a non-linear track of the machine 1. The system 11 dynamically measures and controls a speed of the working point 12 along the track so as to control movement of the object on the machine 1. In one embodiment, the object may be a semiconductor chip requiring testing and packaging. In other embodiment, the object may be other kinds of devices requiring measurement, testing, fabricating, and/or packaging.

In one embodiment, the system 11 includes a setting module 111, an acquisition module 112, a calculation module 113, a determination module 114, and a control module 115. The modules 111, 112, 113, 114, and 115 execute one or more operations for the system 11. Additionally, the machine 1 may comprise one or more specialized or general purpose processors, such as the processor 13 for executing the modules 111, 112, 113, 114, and 115.

The setting module 111 is configured for setting a buffer distance parameter P for controlling the speed of the working point 12 along the track of the machine 1. The buffer distance parameter P is measured in meters (m) in one embodiment. Moreover, the buffer distance parameter P may be determined according to sliding friction of the working point 12 on the machine 1. For example, if the machine 1 generates more sliding friction, the setting module 111 may set a smaller value of P, and if the machine 1 has less sliding friction, the setting module 111 may set a larger value of P. In this embodiment, the buffer distance parameter P is stored in the memory system 14 of the machine 1. Additionally, the setting module 111 may update (for example add/edit/delete) the buffer distance parameter P.

The setting module 111 is also configured for setting a target position D of the working point 12. In this embodiment, the target position D of the working point 12 is also stored in the memory system 14 of the machine 1.

The acquisition module 112 is configured for acquiring a current position C and a current speed $V_t$ of the working point 12 when the working point 12 moves along the machine 1. The current speed $V_t$ of the working point 12 is measured in meters/second (m/s) in this embodiment.

The calculation module 113 is configured for determining a distance L between the current position C of the working point 12 and the target position D. The current position C may be constantly changing. The calculation module 113 is also configured for determining a buffer distance of the working point 12 according to the buffer distance parameter P and the current speed $V_t$. As an example, the buffer distance may equal an arithmetical product of the current speed $V_t$ of the working point and the buffer distance parameter P, being an expression $V_t \times P$.

The determination module 114 is configured for determining if the buffer distance exceeds or equals the distance L between the current position C of the working point 12 and the target position D.

Furthermore, the acquisition module 112 is also configured for determining an instantaneous speed $V_p$ of the working point 12 if the buffer distance exceeds or equals the distance L between the current position C of the working point 12 and the target position D.

The control module 115 is configured for determining a decay speed V based on the buffer distance parameter P, the instantaneous speed $V_p$, and the distance L between the current position C of the working point 12 and the target position D. Additionally, the control module 115 is also configured for controlling the speed according to the decay speed V until the working point 12 reaches the target position D. The current speed $V_t$ will be adjusted to the decay speed V during movement of the working point 12. In an example, the decay speed V is determined through a mathematical formula of $V=V_p \times \exp(1-(V_p \times P)/L)$, where $\exp(x)$ is an exponential function based on a mathematical constant e. e may be referred to as Euler's number, the value of e approximately equaling to "2.718281828," and being a nominal number. The mathematical formula for the decay speed V is obtained through study of overshooting and damping phenomena on the movement of the object. The decay speed V may further be determined via other methods. An exemplary determination of decay speed V follows.

Figure 2A:
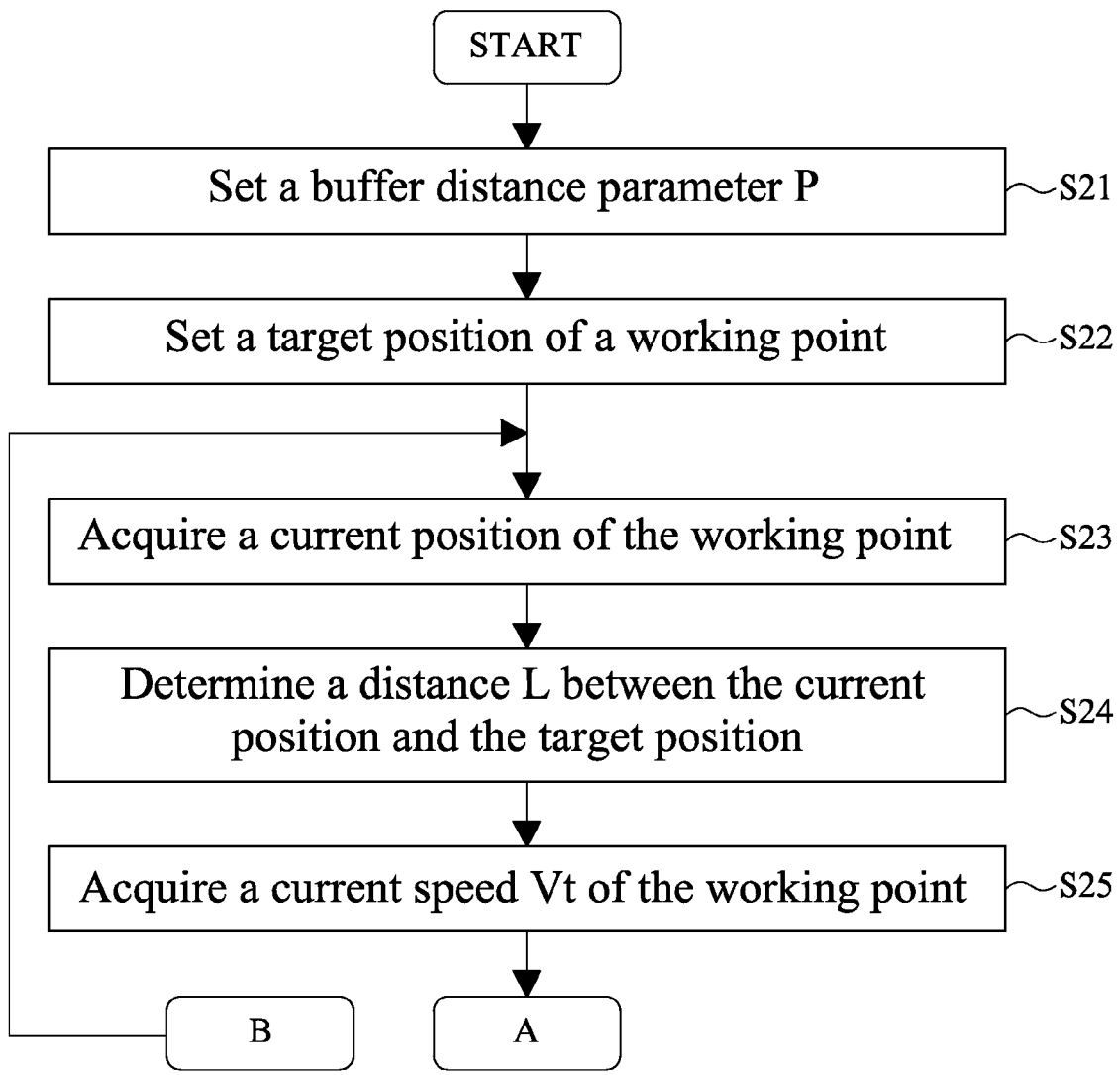
FIG. 2 is a flowchart of an embodiment of a method for controlling movement of an object on a machine.
Figure 2B:
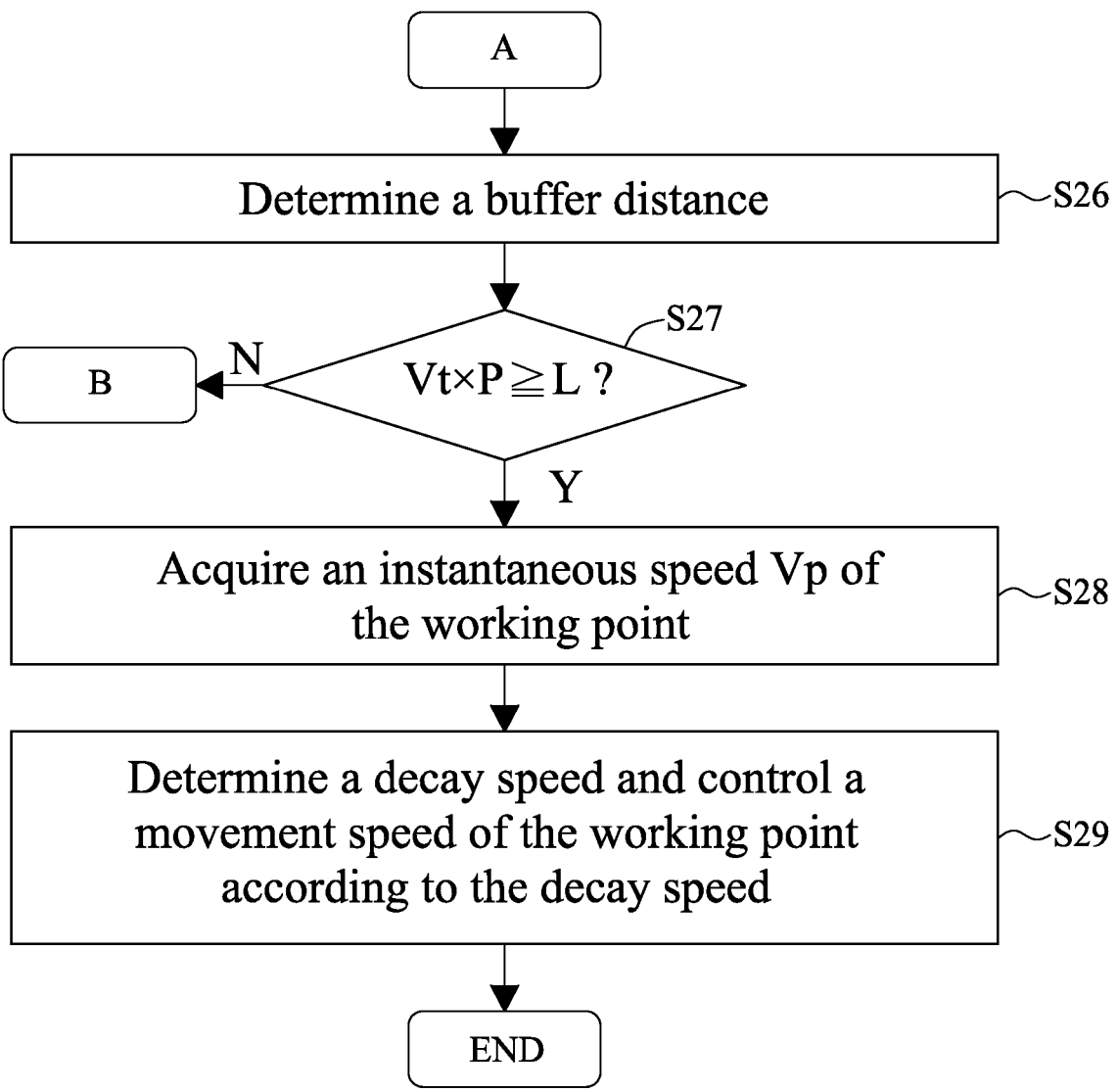
Figure 3:
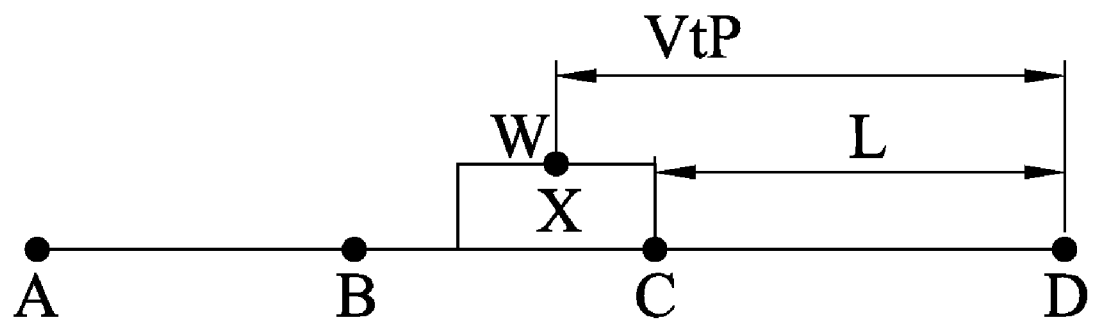
FIG. 3 is a schematic diagram of a related art of a method for controlling movement of an object on a machine.

FIG. 2 is a flowchart of an embodiment of a method for controlling movement of the object on the machine 1. Additional blocks may be added or deleted and the blocks may be executed in a different order than described. First, in block S21, the setting module 111 sets the buffer distance parameter P. As mentioned previously, here, the buffer distance parameter P is stored in the memory system 14 of the machine 1.

In block S22, the setting module 111 sets the target position D of the working point 12.

In block S23, the acquisition module 112 acquires the current position C of the working point 12, moving along the machine 1.

In block S24, the calculation module 113 determines the distance L between the current position C of the working point 12 and the target position D. Here, the distance L may be constantly changing because the current position C may be constantly changing.

In block S25, the acquisition module 112 acquires the current speed $V_t$ of the working point 12.

In block S26, the calculation module 113 determines the buffer distance of the working point 12 according to the buffer distance parameter P and the current speed $V_t$. In this embodiment, the buffer distance is equal to $V_t \times P$.

In block S27, the determination module 114 determines if the buffer distance exceeds or equals the distance L between the current position of the working point 12 and the target position D.

In block S28, the acquisition module 112 is also configured for determining an instantaneous speed $V_p$ of the working point 12 if the buffer distance exceeds or equals the distance L between the current position C of the working point 12 and the target position D.

In block S29,. The control module 115 determines the decay speed V based on the buffer distance parameter P, the instantaneous speed $V_p$, and the distance B between the current position C of the working point 12 and the target position D, and also controls the speed based on the decay speed V until the working point reaches the target position D. The process is thus complete. As mentioned previously, the decay speed V is determined here through a mathematical formula of $V=V_p \times \exp(1-(V_p \times P)/L)$, where $\exp(x)$ is an exponential function based on a mathematical constant e, having a value of approximately 2.718281828.

In block S27, the procedure in the block S23 is repeated to acquire the current position of the working point 12 if the buffer distance is smaller than the distance L between the current position C of the working point 12 and the target position D.

$V_t \times P$ is the buffer distance, and varies dynamically. As mentioned previously, L is the distance between the current position C of the working point 12 and the target position D, such that L is a varying parameter. The $V_t$ is initially zero at the initial position A, and gradually increases during the movement of the working point 12 until $V_t \times P$ approximately equals L. If $V_t \times P$ approximately equals L, value of the exponential function $\exp(1-(V_p \times P)/L)$ will approach 1. As a result of decay of the exponential function as applied, when the working point 12 approaches the target position D, L continues to decrease, resulting in $V_t$ adjusting to approximately zero, preventing overshooting of the object on the machine 1, and stopping the working point 12 at the target position D. This only happens if the working point 12 is in a proximity of the target position D where L gets very small.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A computing system for controlling movement of an object on a machine, the object comprising a working point, the system comprising:
   a setting module configured for setting a buffer distance parameter and setting a target position of the working point;
   an acquisition module configured for acquiring a current position and a current speed of the working point when the working point moves along the machine;
   a calculation module configured for determining a distance between the current position of the working point and the target position, and determining a buffer distance of the working point according to the buffer distance parameter and the current speed of the working point, wherein the buffer distance equals an arithmetical product of the current speed of the working point and the buffer distance parameter;
   a determination module configured for determining if the buffer distance exceeds or equals the distance between the current position of the working point and the target position;
   wherein the acquisition module is also configured for determining an instantaneous speed of the working point if the buffer distance exceeds or equals the distance between the current position of the working point and the target position;
   a control module configured for determining a decay speed based on the buffer distance parameter, the instantaneous speed, and the distance between the current position of the working point and the target position, and for controlling a speed according to the decay speed until the working point reaches the target position, wherein the decay speed is determined according to a mathematical formula of $V=V_p \times \exp(1-(V_p \times P)/L)$, V is the decay speed, $V_p$ is the instantaneous speed of the working point, P is the buffer distance parameter, and L is the distance between the current position of the working point and the target position;

a memory system for storing the buffer distance parameter and the target position of the working point;

at least one processor for executing the setting module, the acquisition module, the calculation module, the determination module, and the control module.

2. The system as claimed in claim 1, wherein the working point of the machine is movable on the machine.

3. The system as claimed in claim 1, wherein the buffer distance parameter is determined according to sliding friction of the working point on the machine.

4. The system claimed in claim 1, wherein the object is a semiconductor chip requiring testing and packaging.

5. A computer-implemented method for controlling movement of an object on a machine, the object comprising a working point, the method comprising:

setting a buffer distance parameter for controlling a speed of the working point along a track of the machine;

setting a target position of the working point;

acquiring a current position of the working point when the working point moves along the machine;

determining a distance between the current position of the working point and the target position;

acquiring a current speed of the working point, and determining a buffer distance of the working point according to the buffer distance parameter and the current speed of the working point, wherein the buffer distance equals an arithmetical product of the current speed of the working point and the buffer distance parameter;

determining if the buffer distance exceeds or equals the distance between the current position of the working point and the target position;

determining an instantaneous speed of the working point if the buffer distance exceeds or equals the distance between the current position of the working point and the target position;

determining a decay speed based on the buffer distance parameter, the instantaneous speed, and the distance between the current position of the working point and the target position, wherein the decay speed is determined according to a mathematical formula of $V = V_p \times \exp(1-(V_p \times P)/L)$, V is the decay speed, $V_p$ is the instantaneous speed of the working point, P is the buffer distance parameter, and L is the distance between the current position of the working point and the target position;

controlling the speed of the working point along the track of the machine according to the decay speed until the working point reaches the target position and at least one processor for executing the aforementioned steps.

6. The method as claimed in claim 5, wherein the working point of the machine is movable on the machine.

7. The method as claimed in claim 5, wherein the buffer distance parameter is determined according to sliding friction of the working point on the machine.

8. The method claimed in claim 5, wherein the object is a semiconductor chip requiring testing and packaging.

9. A computer-readable medium having stored thereon instructions that, when executed by a computer, cause the computer to perform a method for controlling movement of an object on a machine, the object comprising a working point, the method comprising:

setting a buffer distance parameter;

setting a target position of the working point;

acquiring current position of the working point when the working point moves along the machine;

determining a distance between the current position of the working point and the target position;

acquiring current speed of the working point, and determining a buffer distance of the working point according to the buffer distance parameter and the current speed of the working point, wherein the buffer distance equals an arithmetical product of the current speed of the working point and the buffer distance parameter;

determining if the buffer distance exceeds or equals the distance between the current position of the working point and the target position;

determining an instantaneous speed of the working point if the buffer distance exceeds or equals the distance between the current position of the working point and the target position;

determining a decay speed based on the buffer distance parameter, the instantaneous speed, and the distance between the current position of the working point and the target position, wherein the decay speed is determined according to a mathematical formula of $V = V_p \times \exp(1-(V_p \times P)/L)$, V is the decay speed, $V_p$ is the instantaneous speed of the working point, P is the buffer distance parameter, and L is the distance between the current position of the working point and the target position; and controlling a speed according to the decay speed until the working point reaches the target position.

10. The computer-readable medium as claimed in claim 9, wherein the working point of the machine is movable on the machine.

11. The computer-readable medium as claimed in claim 9, wherein the buffer distance parameter is determined according to sliding friction of the working point on the machine.

12. The computer-readable medium claimed in claim 9, wherein the object is a semiconductor chip requiring testing and packaging.

* * * * *